US012161162B2

(12) United States Patent
Luo et al.

(10) Patent No.: US 12,161,162 B2
(45) Date of Patent: Dec. 10, 2024

(54) ATOMIZATION ELEMENT AND ELECTRONIC CIGARETTE

(71) Applicant: SHENZHEN SMOORE TECHNOLOGY LIMITED, Shenzhen (CN)

(72) Inventors: Hongliang Luo, Shenzhen (CN); Lingrong Xiao, Shenzhen (CN); Congwen Xiao, Shenzhen (CN); Xiaoping Li, Shenzhen (CN); Xuebo Xue, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 281 days.

(21) Appl. No.: 17/629,505

(22) PCT Filed: Jul. 23, 2020

(86) PCT No.: PCT/CN2020/103711
§ 371 (c)(1),
(2) Date: Jan. 24, 2022

(87) PCT Pub. No.: WO2021/013211
PCT Pub. Date: Jan. 28, 2021

(65) Prior Publication Data

US 2022/0240582 A1 Aug. 4, 2022

(30) Foreign Application Priority Data

Jul. 25, 2019 (CN) ........................ 201910675904.7

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *H05B 3/16* (2013.01); *H05B 2203/016* (2013.01)

(58) Field of Classification Search
CPC .......... A24F 40/10; A24F 40/46; A24F 40/40; A24F 40/42; A24F 40/485; A24F 40/44;
(Continued)

(56) References Cited

U.S. PATENT DOCUMENTS 9,888,722 B2 2/2018 Chen
2017/0099878 A1* 4/2017 Murison .............. A24F 15/015
(Continued)

FOREIGN PATENT DOCUMENTS

CA 3050412 A1 8/2018
CA 3050415 A1 8/2018
(Continued)

OTHER PUBLICATIONS

International Search Report and Written Opinion from International Application No. PCT/CN2020/103711 mailed Oct. 22, 2020.
(Continued)

*Primary Examiner* — Truc T Nguyen
(74) *Attorney, Agent, or Firm* — Dorsey & Whitney LLP

(57) ABSTRACT

An atomization element (100) and an electronic cigarette. The atomization element (100) comprises a porous ceramic portion (101) and a porous metal portion (102) contacting the porous ceramic portion (101); at least some holes of the porous ceramic portion (101) is communicated with holes of the porous metal portion (102); the porous metal portion (102) has a thickness of not less than 30 μm. The atomization element (100) can sufficiently atomize an e-liquid, thereby improving the taste of aerosol.

15 Claims, 6 Drawing Sheets

(51) Int. Cl.
*A24F 40/44* (2020.01)
*H05B 3/16* (2006.01)

(58) Field of Classification Search
CPC .......... A24F 40/48; A24F 40/51; A24F 40/50; A24F 40/70; A24F 47/00; A24F 15/015; A24F 40/53; A24F 40/95; A24F 40/60; A24F 40/20
See application file for complete search history.

(56) References Cited

U.S. PATENT DOCUMENTS

| | | | | |
|---|---|---|---|---|
| 2018/0221605 | A1* | 8/2018 | Marks | A24F 40/46 |
| 2019/0090549 | A1 | 3/2019 | Davis et al. | |
| 2019/0216132 | A1* | 7/2019 | Phan | C03B 19/06 |
| 2019/0356047 | A1* | 11/2019 | Guduru | A24F 40/46 |
| 2020/0397057 | A1* | 12/2020 | Habicht | A24D 3/17 |
| 2023/0158482 | A1* | 5/2023 | Zhong | F01N 3/0222<br>428/116 |

FOREIGN PATENT DOCUMENTS

| | | | | |
|---|---|---|---|---|
| CN | 104397875 | A | 3/2015 | |
| CN | 104983079 | A | 10/2015 | |
| CN | 105249538 | A | 1/2016 | |
| CN | 105394816 | A | 3/2016 | |
| CN | 105693287 | A | 6/2016 | |
| CN | 205567819 | U | 9/2016 | |
| CN | 205695694 | U | 11/2016 | |
| CN | 106579564 | A | 4/2017 | |
| CN | 106998822 | A | 8/2017 | |
| CN | 107173849 | A | 9/2017 | |
| CN | 206880074 | U | 1/2018 | |
| CN | 207252781 | U | 4/2018 | |
| CN | 207978957 | * | 10/2018 | A24F 47/00 |
| CN | 109414063 | A | 3/2019 | |
| CN | 109414078 | A | 3/2019 | |
| CN | 109875123 | A | 6/2019 | |
| CN | 109875124 | A | 6/2019 | |
| CN | 109875125 | A | 6/2019 | |
| CN | 209002922 | U | 6/2019 | |
| CN | 110447962 | A | 11/2019 | |
| CN | 211185865 | U | 8/2020 | |
| CN | 111602853 | * | 9/2020 | A24F 40/10 |
| KR | 101927135 | B1 | 12/2018 | |

OTHER PUBLICATIONS

Extended European Search Report for European Application No. 20844625.2 mailed Jul. 12, 2023.
Third Office Action for Chinese Application No. 201910675904.7 mailed Oct. 30, 2024.

* cited by examiner

ATOMIZATION ELEMENT AND ELECTRONIC CIGARETTE

TECHNICAL FIELD

The present disclosure relates to the technical field of electronic cigarettes, in particular to an atomizing element and an electronic cigarette.

BACKGROUND

At present, electronic cigarettes usually use an atomizing element to heat and atomize cigarette liquid, traditional atomizing elements include a liquid absorbing core made of glass fiber or liquid absorbing cotton for absorbing a cigarette liquid, and a resistance wire wound outside of the liquid absorbing core for heating and atomizing the cigarette liquid in the core. However, the traditional atomization element has a defect of a small contact area of the resistance wire with the cigarette liquid, so that the atomization speed is low, the atomization amount is small, and there is a risk of dry burning and therefore overheating when a local area contacts no cigarette liquid, causing a miscellaneous smell.

SUMMARY

According to various embodiments of the present disclosure, there is provided an atomizing element including:

- a porous ceramic portion; and
- a porous metal portion in contact with the porous ceramic portion, at least a part of pores of the porous ceramic portion communicating with pores of the porous metal portion, and the porous metal portion having a thickness of not less than 30 μm.

In one of the embodiments, the porous metal portion has an average pore diameter in a range of 5 μm to 60 μm, a porosity in a range of 10% to 50%, and a thickness in a range of 30 μm to 200 μm.

In one of the embodiments, the porous metal portion has an average pore diameter in a range of 0.1 mm to 5 mm, a porosity in a range of 60% to 95%, and a thickness in a range of 50 μm to 1000 μm.

In one of the embodiments, the porous ceramic portion has an atomizing surface on which the porous metal portion is disposed.

In one of the embodiments, the porous metal portion is formed on the atomizing surface in a linear, curved, zigzag, rectangle, grid, or annular shape.

In one of the embodiments, the porous metal portion is provided inside the porous ceramic portion.

In one of the embodiments, the porous ceramic portion is formed with a groove in which the porous metal portion is filled.

In one of the embodiments, a longitudinal section of the groove is in a shape of square, semicircular, V or trapezoidal.

In one of the embodiments, the porous ceramic portion includes a body having a plurality of protrusions arranged in parallel, and the porous metal portion is filled between adjacent protrusions.

In one of the embodiments, the porous ceramic portion has an average pore diameter in a range of 10 μm to 50 μm, and a porosity in a range of 30% to 70%.

In one of the embodiments, the porous metal portion is selected from at least one of the group consisting of porous nickel product, porous titanium product, porous nickel-iron alloy product, porous nickel-copper alloy product, porous nickel-chromium alloy product and porous iron-chromium-aluminum alloy portion product.

In one of the embodiments, the porous ceramic portion is made of at least one of porous alumina ceramics, porous silica ceramics, porous silicon carbide ceramics, porous cordierite ceramics, porous mullite ceramics, porous sepiolite ceramics and porous diatomite ceramics.

In one of the embodiments, the porous ceramic portion and the porous metal portion are fixedly connected.

In one of the embodiments, the atomizing element further includes an electrode in contact with the porous metal portion.

In one of the embodiments, the electrode is a silver paste electrode.

An electronic cigarette includes the atomizing element described as above.

The details of one or more embodiments of the present application are set forth in the following description and accompanying drawings. Other features, objects and advantages of the present application will become apparent from the specification, drawings and claims.

In order to better describe and explain those invented embodiments and/or examples disclosed herein, one or more drawings may be referred to. The additional details or examples used for describing the drawings should not be considered as limiting the scope of any one of the disclosures, the currently described embodiments and/or examples, as well as the best modes of those present applications currently understood.

DETAILED DESCRIPTION OF THE EMBODIMENTS

In order to facilitate the understanding of the application, the present application will be described in a more comprehensive manner with reference to the relevant drawings. Preferred embodiments of the present application are shown in the accompanying drawings. However, the present application can be implemented in many different forms and is not limited to the embodiments described herein. On the contrary, the purpose of providing these embodiments is to make the understanding of the disclosure of the present application more thorough and comprehensive.

It should be noted that when an element is referred to as being "fixed" to another element, it can be directly on the element or an intermediate element may also be present. When an element is considered to be "connected" to another element, it can be directly connected to the element or an intermediate element may be present at the same time. The terms "vertical", "horizontal", "left", "right" and similar expressions used herein are for illustrative purposes only.

Unless otherwise defined, all technical and scientific terms used herein have the same meanings as those commonly understood by those skilled in the technical field of the present application. The terms used in the specification of the present application herein is only for the purpose of describing specific embodiments, and is not intended to limit the present application.

Figure 1:
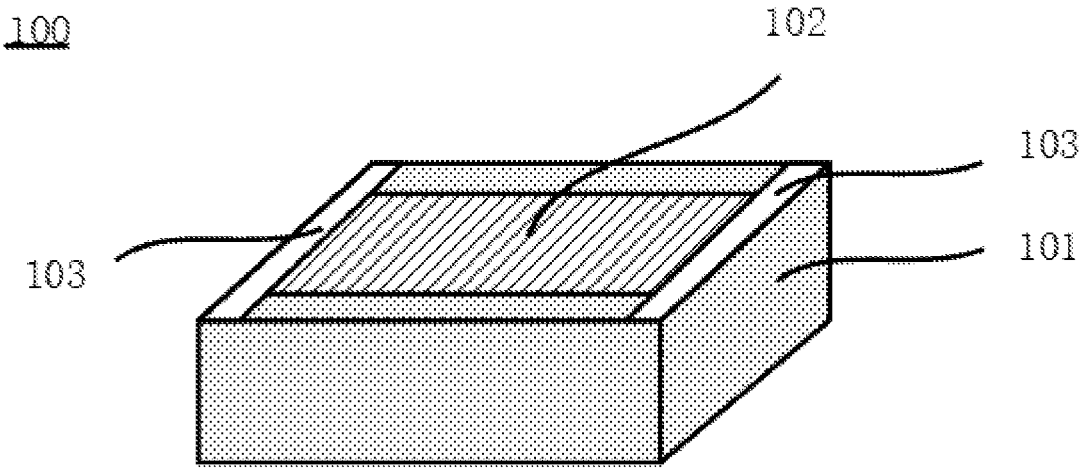
FIG. 1 is a schematic view of an atomizing element in one embodiment.

Referring to FIG. 1, an electronic cigarette according to one embodiment of the present disclosure includes an atomizing element 100, which includes a porous ceramic portion 101, a porous metal portion 102, and an electrode 103 in contact with the porous metal portion 102. Both of the porous ceramic portion 101 and the porous metal portion 102 have porous structures, and the porous ceramic portion 101 and the porous metal portion 102 are in contact with each other, such that at least part of pores of the porous ceramic portion 101 are in communication with pores of the porous metal portion 102. The porous ceramic portion 101 is used for guiding and storing liquid. The porous metal portion 102 may not only be used for conveying atomization energy and generating heat, but also have the functions of guiding and storing the liquid. In one embodiment, the porous ceramic portion 101 and the porous metal portion 102 are fixedly connected to form a strong bonding force, so as to avoid a phenomenon that the porous ceramic portion 101 and the porous metal portion 102 are separated from each other during use.

In an idle state, the liquid can be stored in the pores of the porous ceramic portion 101 and the porous metal portion 102. During atomization operation, the porous metal portion 102 is powered by the electrode 103 to generate heat, and the liquid may be atomized inside the porous metal portion 102, which overcomes the defect of the small contact area of the resistance wire with the liquid of the conventional atomization element, thus greatly increasing an effective atomization specific area, and increasing the atomization speed, such that the atomization is more sufficient, and the scorch smell is prevented.

Specifically, a thickness of the porous metal portion 102 is no less than 30 μm. Due to the presence of a porous structure, the heat inside the porous metal portion 102 can be timely and sufficiently conducted to the liquid, and even though the thickness of the porous metal portion 102 is large, a uniform and consistent heating effect can still be achieved, the phenomenon of dry burning caused by local overheating will not occur, consistency of the smoke is better, and the taste is purer, which may effectively prevent the generation of miscellaneous smell.

In one of the embodiments, the porous metal portion 102 has an average pore diameter in a range of 5 μm to 60 μm, a porosity in a range of 10% to 50%, and a thickness in a range of 30 μm to 200 μm. As such, the porous metal portion 102 has a microporous structure with an average pore diameter close to that of the porous ceramic portion 101, such that more pores in the porous metal portion 102 can be communicated with the pores of the porous ceramic portion 101, which is beneficial to a full atomization of the liquid, and thus increasing the smoke amount, and the consistency and the taste of the atomized smoke are better. In addition, when the porous metal portion 102 has the above structure, even for some liquid with high viscosity, a rapid atomization may be realized, and the shortcoming of small amount of first-mouth smoke and the like are prevented, thus causing a satisfactory use experience. Furthermore, the porous metal portion 102 may be a porous metal film obtained by printing.

In another embodiment, the porous metal portion 102 has an average pore diameter in a range of 0.1 mm to 5 mm, and a porosity in a range of 60% to 95%. Then, the porous metal portion 102 has a strong liquid storing and absorbing ability, while having a homogeneous microporous structure, which is beneficial for uniformly and stably conveying the energy required by atomization. Due to a large specific surface area, the liquid stored in the micropores of the porous metal portion 102 can be quickly and effectively atomized, which effectively improves satisfaction feeling for smoke and reducibility of fragrance. The porous metal portion 102 having the above structure can have a thickness in a range of 50 μm to 1000 μm, and still may achieve a relatively even heat generating effect even with a greater thickness, which effectively avoids producing poisonous matter. Optionally, the porous metal portion 102 may be a foamed metal. The foamed metal may be combined with the porous ceramic portion 101 through co-sintering, such that the bonding ability becomes stronger and the risk of falling off can be avoided. Meanwhile, the resistance of the foam metal is relatively stable, such that the atomization of high-power smoking equipment and high-viscosity herbal liquid can be achieved.

Specifically, the porous ceramic portion 101 has surfaces that includes an atomizing surface and a liquid absorbing surface. The number of atomization surface and liquid absorption surface is not fixed, and can be designed as desired. For example, when the atomizing surface is one surface, such as an upper surface, of the porous ceramic portion 101, the liquid absorption surface may be another surface other than the atomizing surface, such as a lower surface and/or a side surface. Alternatively, the atomizing surface is multiple surfaces of the porous ceramic portion 101, such as the upper surface and the side surface, and the liquid absorbing surface may be the lower surface of the porous ceramic portion 101. In some embodiments, the porous metal portion 102 is disposed on the atomizing surface of the porous ceramic portion 101, referring to FIGS. 1 to 8. FIGS. 2 to 7 are top views, in which the porous ceramic portion 101 is in a shape of rectangular parallelepiped, an upper surface of which is the atomizing surface, and the lower surface and side surfaces (not shown) of which are liquid absorbing surfaces, and the porous metal portion 102 is provided on the atomizing surface of the porous ceramic portion 101, i.e. on the upper surface. In the atomizing element 101 of FIG. 8, the porous ceramic portion 101 has a plurality of atomizing surfaces (upper surface, left side, and right side), and the porous metal portion 102 is provided on the above atomizing surface of the porous ceramic portion 101 (left surface being obscured). At this time, the contact area between the porous metal portion 102 and the porous ceramic portion 101 becomes larger, which improves the liquid guiding performance which is beneficial for achieving a better atomization effect.

Figure 2:
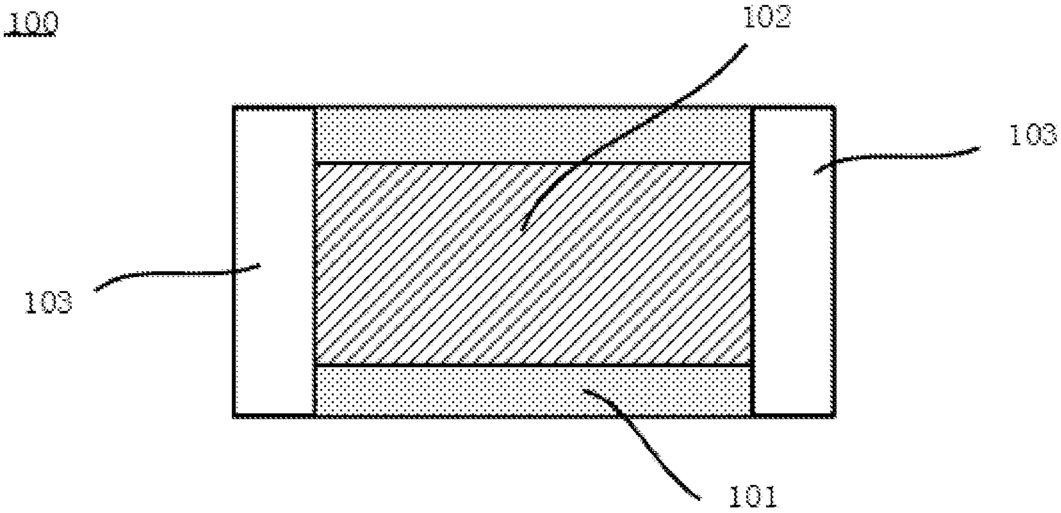
FIG. 2 is a top view of an atomizing element in another embodiment.
Figure 3:
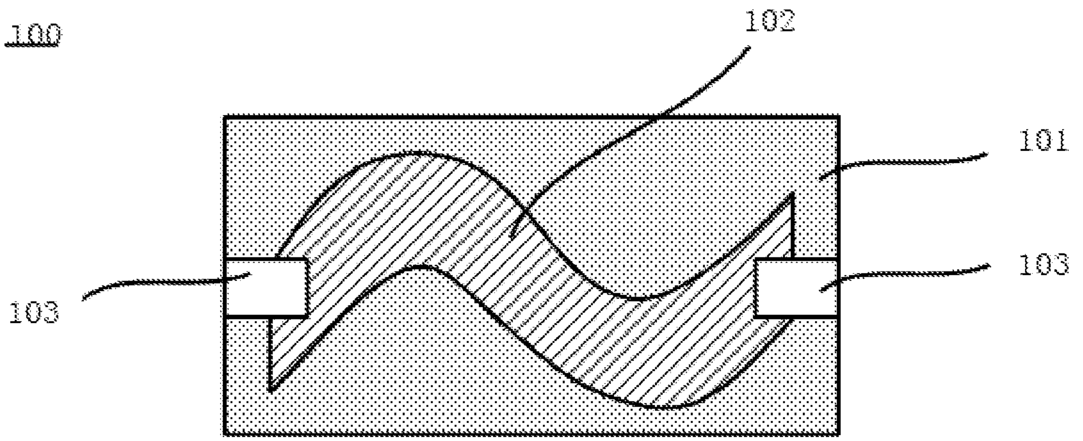
FIG. 3 is a top view of an atomizing element in another embodiment.
Figure 4:
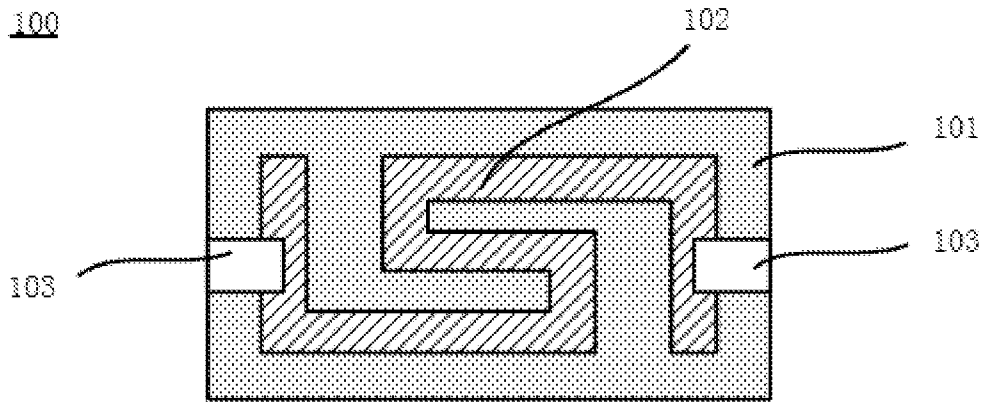
FIG. 4 is a top view of an atomizing element in another embodiment.
Figure 5:
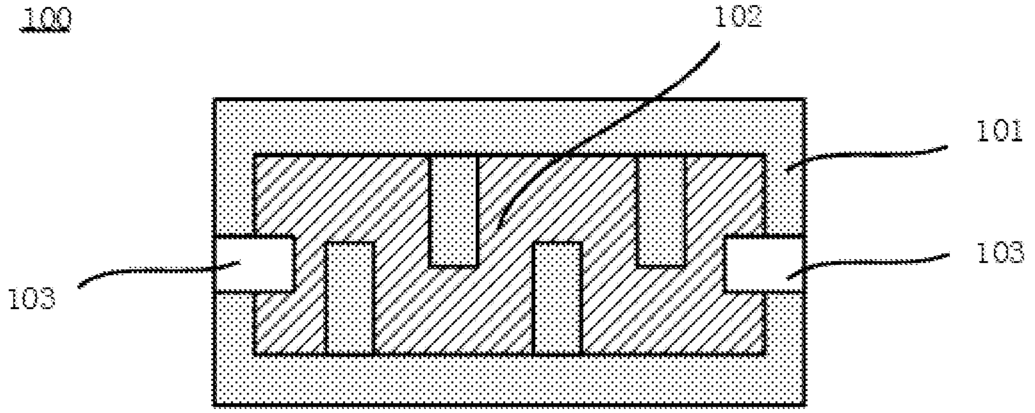
FIG. 5 is a top view of an atomizing element in another embodiment.
Figure 6:
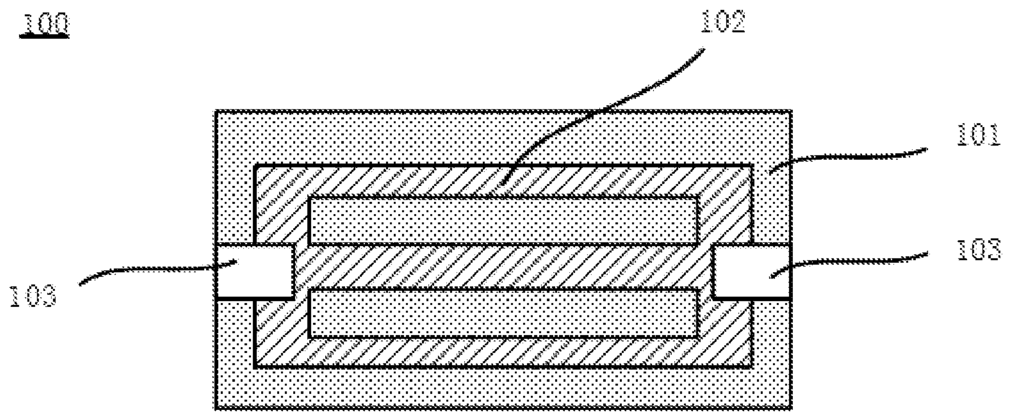
FIG. 6 is a top view of an atomizing element in another embodiment.
Figure 7:
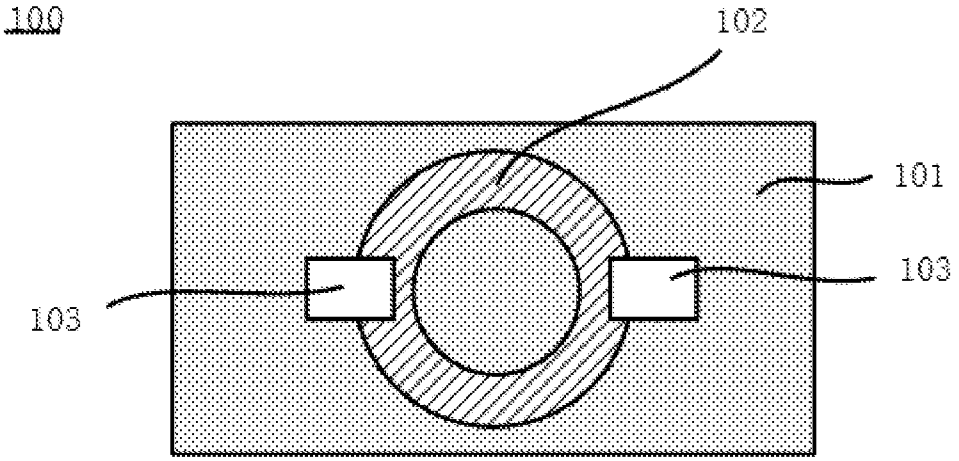
FIG. 7 is a top view of an atomizing element in another embodiment.

Specifically, the shape of the porous metal portion 102 is not particularly limited, and can be designed according to needs. In one embodiment, the shape of the porous metal portion 102 is linear (as shown in FIG. 2). In other embodiments, the porous metal portion 102 may have a shape of curved line, zigzag line, rectangle, "目" shape, "回" shape, annular or "田" shape. The curved line may include any common curves, such as sine curve, spiral line, folium, curve shaped of "8", etc. The zigzag line type means that the porous metal portion 102 has multiple linear segments connected end to end and two adjacent linear segments intersects at an angle greater than 0 and less than 180 degrees. For example, in the atomizing element 100 of the another embodiment shown in FIG. 3, the shape of the porous metal portion 102 is sinusoidal; in the atomizing element 100 shown in FIG. 4, the porous metal portion 102 is formed in an "S" shape; in the atomizing element 100 of the another embodiment shown in FIG. 5, the porous metal portion 102 is in the shape of a right-angle reciprocating zigzag line; in the atomizing element 100 shown in FIG. 6, the atomizing surface of the porous ceramic portion 101 has the porous metal portion 102 shaped as "日"; and in the atomizing element 100 of the another embodiment shown in FIG. 7, the porous metal portion 102 has an annular shape. All the porous metal portions 102 in the above embodiments can achieve a better atomization effect.

In some embodiments, the porous metal portion 102 may be disposed inside the porous ceramic portion 101. Compared with the case where the porous metal portion 102 is disposed on the surface of the porous ceramic portion 101, the porous metal portion 102 provided inside the porous ceramic portion 101 facilitates further increasing the contact area between the porous metal portion 102 and the porous ceramic portion 101, thus increasing the speed of guiding the liquid and optimizing the effect of atomization.

Figure 9:
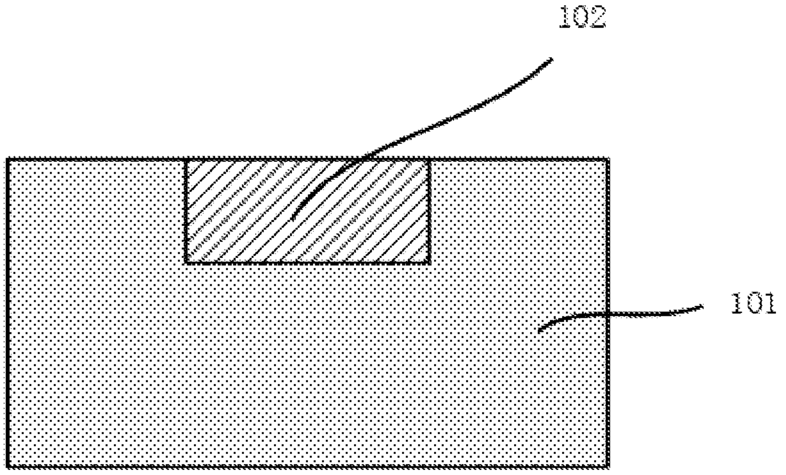
FIG. 9 is a sectional view of an atomizing element in another embodiment.
Figure 10:
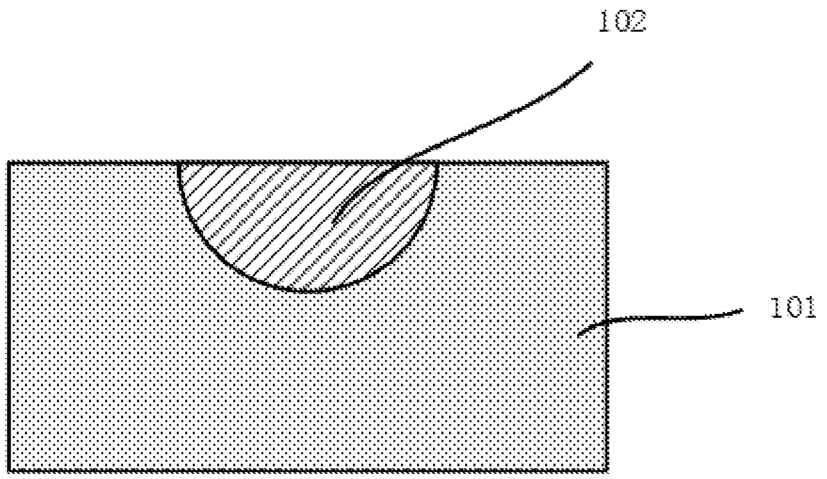
FIG. 10 is a sectional view of an atomizing element in another embodiment.
Figure 11:
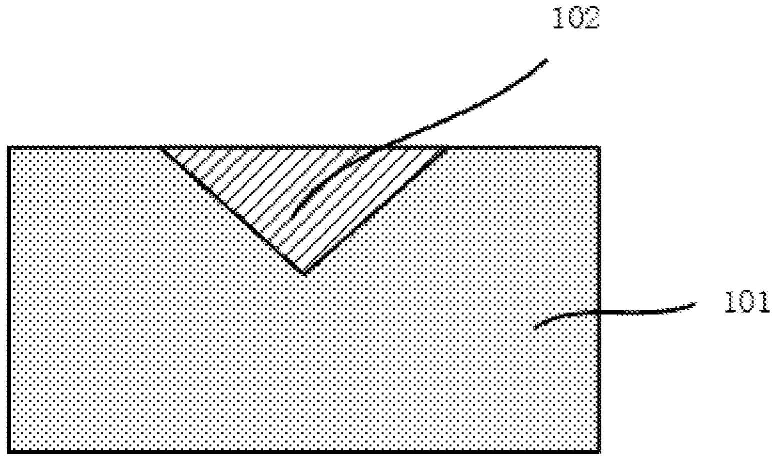
FIG. 11 is a sectional view of an atomizing element in another embodiment.
Figure 12:
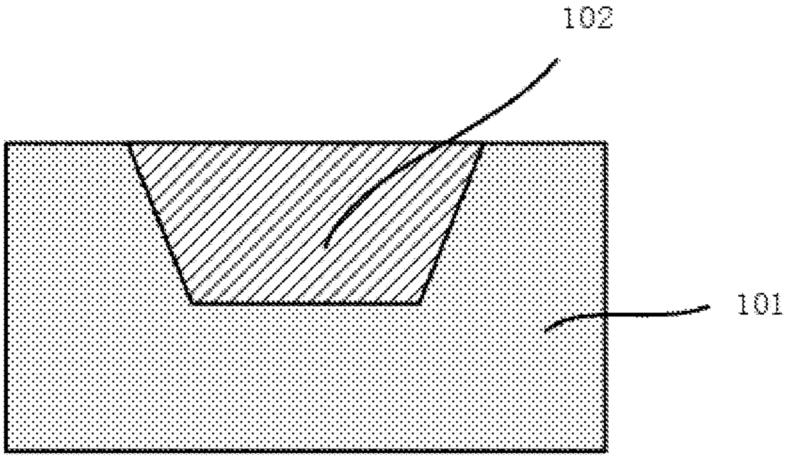
FIG. 12 is a sectional view of an atomizing element in another embodiment.

In one of the embodiments, the porous ceramic portion 101 is formed with a groove. FIGS. 9 to 12 are sectional views of the atomizing element 100 with the porous ceramic portion 101 having the groove (the electrode 103 being not shown), in which the porous metal portion 102 is filled. At this time, each of the contact surfaces of the porous metal portion 102 inside the porous ceramic portion 101 can be regarded as a liquid absorbing surface. There is no special limitation on the shape of the groove, and the groove can be designed as required. For example, in one embodiment, as shown in FIG. 9, the shape of the longitudinal section of the groove is rectangular. In this case, the bottom surface and both side surfaces of the porous metal portion 102 can be regarded as the liquid absorbing surface. In other embodiments, the shape of the longitudinal section of the groove may be semicircular (see FIG. 10), V-shaped (see FIG. 11) or trapezoidal (see FIG. 12), etc. The above-mentioned longitudinal section refers to a section along a vertical direction. In this embodiment, the porous metal portion 102 may be formed in the groove by screen printing.

In some embodiments, the porous ceramic portion 101 can be formed to have protrusions, and the porous metal portion 102 is brought to be in contact with the protrusions, so as to increase the contact area between the porous metal portion 102 and the porous ceramic portion 101. In one embodiment, referring to FIG. 13 (the electrode 103 being not shown), the porous ceramic portion 101 includes a body 1011, on which a pair of protrusions 1012 are arranged in parallel, and the porous metal portion 102 is filled between the pair of protrusions 1012. In other embodiments, the number of protrusions 1012 can be adjusted as desired, such as 3, or 4, etc. At this time, the porous metal portion 102 is filled between adjacent protrusions 1012. Specifically, the protrusion 1012 may be a columnar protrusion. The protrusions 1012 may be formed on the body 1011 by printing, and the porous metal portion 102 may be formed between the adjacent protrusions 1012 by screen printing.

In one embodiment, the material porous metal portion 102 is made of at least one of a porous nickel product, a porous titanium product, a porous ferronickel alloy product, a porous nickel-copper alloy product, a porous nickel-chromium alloy product, and a porous iron-chromium-aluminum alloy product. The above listed products have a better thermal conductivity, which is beneficial for atomization.

The porous ceramic portion 101 has an average pore diameter in a range of 10 μm to 50 μm, a porosity in a range of 30% to 70%. In one embodiment, the porous ceramic portion 101 is made of at least one of porous alumina ceramic, porous silica ceramic, porous silicon carbide ceramic, porous cordierite ceramic, porous mullite ceramic, porous sepiolite ceramic, and porous diatomite ceramic. The above listed porous ceramics have a stable chemical property, a high temperature resistance and a better liquid storage capacity.

In one embodiment, the electrode 103 is a silver paste electrode, which is formed by covering the porous metal portion 102 through printing or painting, and then integrally sintered to be in contact with the porous metal portion 102.

The present disclosure is further illustrated by way of examples and is not intended to limit the present disclosure.

In the following examples, the pore diameters of the pores in the porous metal portion 102 and the porous ceramic portion 101 are determined using a mercury pressing method (referring to the Chinese national standard "GBT 21650.1-2008 Mercury Pressing Method and Gas Adsorption Method to Determine the Pore Diameter Distribution and Porosity of the Solid Material"); the porosity is measured by a boiling method or a vacuum method (referring to Chinese national standard GB/T 3810.3-2006 Section 3 of Ceramic Tile Testing Method: Determination of Water Absorption, Apparent Porosity, Apparent Relative Density and Bulk Density; and the thickness is measured by a film thickness gauge.

Example 1

The structure of the atomizing element 100 of this embodiment is shown in FIG. 1, and the porous ceramic portion 101 is made of porous alumina ceramic and has an average pore diameter of 27 μm, a porosity of 45%, and a thickness of 2530 μm.

A linear porous metal film is formed on the upper surface of the porous ceramic portion 101 by screen printing with a nickel-based alloy, then silver paste is screen printed on both ends of the porous metal film to form a silver electrode covering the porous metal film, so as to obtain the atomizing element 100 by sintering, wherein the porous metal film has an average pore diameter of 15 μm, a porosity of 30% and a thickness of 100 μm, and at least part of the pores of the porous metal film are communicated with the pores of the porous ceramic portion 101.

Example 2

Figure 8:
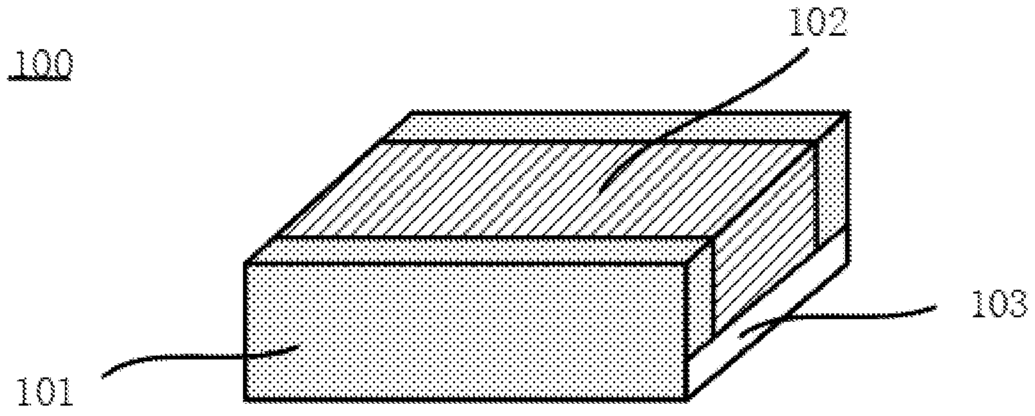
FIG. 8 is a schematic view of the structure of an atomizing element in another embodiment.

The structure of the atomizing element 100 of this embodiment is shown in FIG. 8, and its preparation procedure was roughly the same as that in embodiment 1 except that the porous metal films are formed by screen printing on each of the upper surface, the left side and the right side of the porous ceramic portion 101. The porous metal film has an average pore diameter of 25 μm, a porosity of 20%, and a thickness of 80 μm, and at least part of the pores of the porous metal film were communicated with the pores of the porous ceramic portion 101.

Example 3

The atomizing element 100 of this embodiment is structured as shown in FIG. 9, and the porous ceramic portion 101 is made of a porous silica ceramic and has an average pore diameter of 35 μm, a porosity of 50%, and a thickness of 3000 μm.

First, grooves with a depth of 100 μm and a square longitudinal section are formed on the upper surface of the porous ceramic portion 101, then a porous metal film is form in said grooves with nickel-base alloy by means of screen printing, and then silver paste is screen printed on both ends of the porous metal film to form a silver electrode covering the porous metal film, so as to obtain the atomizing element 100 by sintering. The porous metal film has an average pore diameter of 43 μm, a porosity of 20% and a thickness of 98 μm, and at least part of the pores of the porous metal film are communicated with the pores of the porous ceramic portion 101.

Example 4

Figure 13:
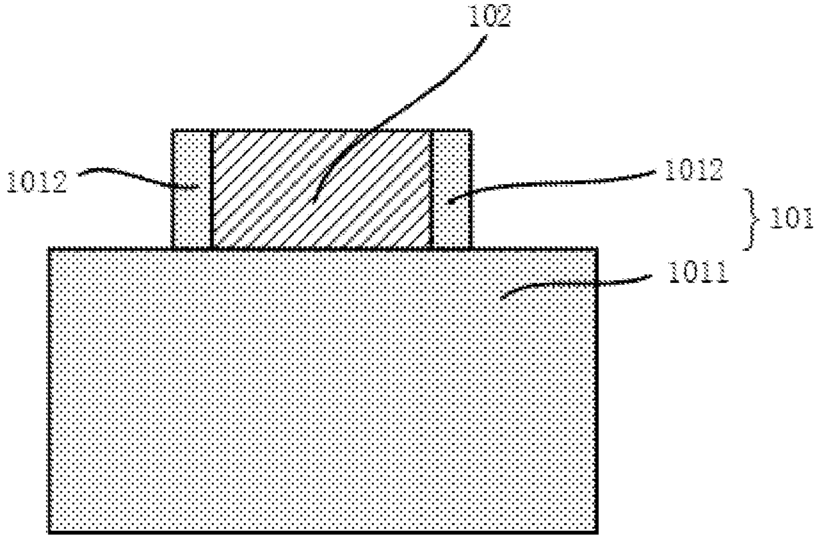
FIG. 13 is a sectional view of an atomizing element in another embodiment.

The atomizing element 100 of this embodiment is structured as shown in FIG. 13, and the porous ceramic portion body 1011 is made of a porous cordierite ceramic and has an average pore diameter of 37 μm, a porosity of 53%, and a thickness of 3,500 μm.

A pair of columnar protrusions having a height of 85 μm are formed on the upper surface of the porous ceramic portion 101 by screen printing, a porous metal film is forming between the pair of columnar protrusions with a nickel-based alloy by printing, then silver paste is screen printed on both ends of the porous metal film to form a silver electrode covering the porous metal film, so as to obtain the atomizing element 100 by sintering. The porous metal film has an average pore diameter of 50 μm, a porosity of 18%, and a thickness of 80 μm, and at least part of the pores of the porous metal film are communicated with the pores of the porous ceramic portion 101.

Example 5

The atomizing element 100 of this example was prepared approximately the same as in example 1 except that the foam metal of a nickel-based alloy is screen printed on the upper surface of the porous ceramic portion 101. The foam metal has an average pore diameter of 2 mm, a porosity of 80%, and a thickness of 270 μm, with at least a part of the pores of the foam metal communicating with the pores of the porous ceramic portion 101.

Comparative Example 1

The preparation process of the atomizing element 100 in this example is roughly the same as that of embodiment 1 except that a porous metal film is formed on the upper surface of the porous ceramic portion 101 by screen printing and has an average pore diameter of 10 μm and a porosity of 8%.

Test Example

Each of the atomizing elements 100 of Examples 1-5 and the Comparative Example 1 were assembled into electronic cigarettes and the atomization tests were performed by weighing with results shown in table 1.

TABLE 1

| Examples | smoke amount(mg) | smoke mouthfeel | | | |
|---|---|---|---|---|---|
| Example 1 | 6.2 | uniform smoke particles | good consistency | pure mouthfeel | no miscellaneous smell |
| Example 2 | 6.5 | uniform smoke particles | good consistency | pure mouthfeel | no miscellaneous smell |
| Example 3 | 6.7 | uniform smoke particles | good consistency | pure mouthfeel | no miscellaneous smell |
| Example 4 | 7.2 | uniform smoke particles | good consistency | pure mouthfeel | no miscellaneous smell |
| Example 5 | 5.8 | uniform smoke particles | good consistency | pure mouthfeel | no miscellaneous smell |
| Comparative Example | 4.5 | large smoke particles | uneven mouthfeel | | miscellaneous smell |

As seen from Table 1, the atomizing elements 100 of Examples 1-5 may sufficiently atomize the liquid, effectively improve the mouthfeel of the smoke, and avoid generation of miscellaneous smell.

In the atomizing element 100, the porous ceramic portion 101 is used for guiding and storing liquid, and the porous metal portion 102 may not only be used for conveying atomization energy, but also have the functions of guiding and storing liquid. The atomizing element 100 at least has the following advantages:

(1) with the porous structure of the porous metal portion 102, the liquid can be fully atomized, the effective atomization specific area is greatly increased, and the atomization is more sufficient;

(2) the consistency of the smoke is better, the taste is purer, and the miscellaneous smell can be effectively avoided; and (3) the heat can be timely and fully conducted to the liquid, effectively avoiding local overheating and dry burning phenomenon.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An atomizing element, comprising:

a porous ceramic portion; and a porous metal portion in contact with the porous ceramic portion, at least a part of pores of the porous ceramic portion being in communication with pores of the porous metal portion, and the porous metal portion having a thickness of no less than 30 μm, wherein the porous metal portion has an average pore diameter in a range of 5 μm to 60 μm, a porosity in a range of 10% to 50%, and a thickness in a range of 30 μm to 200 μm.

2. The atomizing element according to claim 1, wherein the porous ceramic portion has an atomizing surface, and the porous metal portion is disposed on the atomizing surface.

3. The atomizing element according to claim 1, wherein the porous metal portion is provided inside the porous ceramic portion.

4. The atomizing element according to claim 1, wherein the porous ceramic portion comprises a body provided with a plurality of protrusions arranged in parallel, and the porous metal portion is filled between adjacent protrusions.

5. The atomizing element according to claim 1, wherein the porous metal portion is selected from at least one of the group consisting of porous nickel product, porous titanium product, porous nickel-iron alloy product, porous nickel-copper alloy product, porous nickel-chromium alloy product, and porous iron-chromium-aluminum alloy portion product.

6. The atomizing element according to claim 1, wherein the porous ceramic portion is selected from at least one of the group consisting of porous alumina ceramic, porous silica ceramic, porous silicon carbide ceramic, porous cordierite ceramic, porous mullite ceramic, porous sepiolite ceramic, and porous diatomite ceramic.

7. The atomizing element according to claim 1, wherein the porous ceramic portion and the porous metal portion are fixedly connected.

8. The atomizing element according to claim 1, further comprising an electrode in contact with the porous metal portion.

9. An electronic cigarette, comprising the atomizing element according to claim 1.

10. The atomizing element according to claim 2, wherein the porous metal portion is formed on the atomizing surface in a linear, curved, zigzag, rectangle, grid, or annular shape.

11. The atomizing element according to claim 3, wherein the porous ceramic portion is formed with a groove, and the porous metal portion is filled in the groove.

12. The atomizing element according to claim 11, wherein a longitudinal section of the groove is in a shape of square, semicircular, V or trapezoidal.

13. The atomizing element according to claim 8, wherein the electrode is a silver paste electrode.

14. An atomizing element according to claim 1, comprising:

a porous ceramic portion; and a porous metal portion in contact with the porous ceramic portion, at least a part of pores of the porous ceramic portion being in communication with pores of the porous metal portion, and the porous metal portion having a thickness of no less than 30 μm, wherein the porous metal portion has an average pore diameter in a range of 0.1 mm to 5 mm, a porosity in a range of 60% to 95%, and a thickness in a range of 50 μm to 1000 μm.

15. An atomizing element-according to claim 1, comprising:

a porous ceramic portion; and a porous metal portion in contact with the porous ceramic portion, at least a part of pores of the porous ceramic portion being in communication with pores of the porous metal portion, and the porous metal portion having a thickness of no less than 30 μm, wherein the porous ceramic portion has an average pore diameter in a range of 10 μm to 50 μm, and a porosity in a range of 30% to 70%.

* * * * *